US008594838B2

(12) United States Patent
Selker et al.

(10) Patent No.: US 8,594,838 B2
(45) Date of Patent: Nov. 26, 2013

(54) VENDING MACHINE (75) Inventors: Edwin Selker, Palo Alto, CA (US);
Connor Dickie, London, CA (US);
Matthew Hockenberry, Cambridge, MA (US); Jon Wetzel, Evanston, IL (US); Julius Akinyemi, Greenwich, CT (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 12/637,029

(22) Filed: Dec. 14, 2009

(65) Prior Publication Data

US 2011/0144801 A1    Jun. 16, 2011

(51) Int. Cl.
*G06F 17/00* (2006.01)

(52) U.S. Cl.
USPC ............................ 700/244; 700/236; 700/232

(58) Field of Classification Search
USPC .......................................... 700/232, 236, 244
See application file for complete search history.

(56) References Cited

U.S. PATENT DOCUMENTS

| 4,454,670 | A | 6/1984 | Bachmann et al. |
| 5,522,310 | A * | 6/1996 | Black et al. ................ 99/357 |
| 6,256,046 | B1 | 7/2001 | Waters et al. |
| 6,315,197 | B1 | 11/2001 | Beardsley |
| 6,680,714 | B2 | 1/2004 | Wilmore |
| 6,830,160 | B2 | 12/2004 | Risolia |
| 7,680,324 | B2 * | 3/2010 | Boncyk et al. ............ 382/165 |
| 8,312,660 | B1 * | 11/2012 | Fujisaki ..................... 42/70.11 |
| 2003/0040838 | A1 | 2/2003 | Lagunzad et al. |
| 2003/0078895 | A1 | 4/2003 | MacKay |
| 2004/0193313 | A1 * | 9/2004 | Cornet et al. ............... 700/231 |
| 2005/0155060 | A1 * | 7/2005 | Sato et al. ..................... 725/42 |
| 2005/0174473 | A1 * | 8/2005 | Morgan et al. ............. 348/370 |
| 2005/0195173 | A1 | 9/2005 | MacKay |
| 2006/0190345 | A1 | 8/2006 | Crowley |
| 2008/0274808 | A1 * | 11/2008 | Walker et al. ................ 463/31 |
| 2010/0138037 | A1 * | 6/2010 | Adelberg et al. .......... 700/241 |
| 2010/0191369 | A1 * | 7/2010 | Kim ............................ 700/235 |
| 2010/0234986 | A1 * | 9/2010 | Clopton et al. ............. 700/236 |
| 2010/0304675 | A1 * | 12/2010 | Rekimoto et al. .......... 455/41.2 |
| 2010/0308999 | A1 * | 12/2010 | Chornenky ................ 340/573.1 |

OTHER PUBLICATIONS

Jon William Wetzel, Face Interface: A Methodology for Experiential Learning of Input Modalities, Masters Thesis, Massachusetts Institute of Technology, 2007.
C. Lee, C. Jang, T. Chen, Jon Wetzel, Y. Shen, Ted Edwin Selker, Attention Meter: A Vision-based Input Toolkit for Interaction Designers, 2006, CHI 2006 extended abstracts on human factors in computing systems, pp. 1007-1012, ACM, New York, NY, USA.
Roel Vertegaal, Designing Attentive Interfaces, ETRA 2002 Proceedings of the 2002 symposium on eye tracking research & applications, 2002, pp. 23-30, ACM, New York, NY, USA.

(Continued)

*Primary Examiner* — Michael K Collins
(74) *Attorney, Agent, or Firm* — Stephen R. Otis (57) ABSTRACT

In an exemplary embodiment of this invention, a vending machine may include sensors for capturing audio and visual data. A processing unit in the vending machine may analyze this data to calculate an attention score that is indicative of whether attention is being paid to the vending machine. Alternatively, or in addition, the processing unit may analyze this data to calculate the gender or emotional state of a person. Based on these calculations, a vending machine may alter its behavior, such as by changing its audiovisual output.

11 Claims, 5 Drawing Sheets

(56) References Cited

OTHER PUBLICATIONS

Jackie Lee, Jon Wetzel, Ted Edwin Selker, Enhancing Interface Design Using Attentive Interaction Design Toolkit, SIGGRAPH 2006, 2006, ACM, New York, NY, USA.

T Edwin Selker, Visual Attentive Interfaces, BT Technology Journal, vol. 22, Issue 4, Oct. 2004, Kluwer Academic Publishers, Bingham, MA, USA.

Jeffrey Shell, Ted Edwin Selker, Roel Vertegaal, Interacting with Groups of Computers, Communicatons of the ACM, vol. 46, Issue 3, Mar. 2003, ACM, New York, NY, USA.

* cited by examiner

VENDING MACHINE

FIELD OF THE INVENTION

This invention relates generally to vending machines.

BACKGROUND OF THE INVENTION

A traditional vending machine cannot detect the level of attention being paid to it. Nor can it determine the emotional state, social context or gender of its users.

SUMMARY OF THE INVENTION

A traditional vending machine focuses on selling products. As a result, people interact with it for only a brief time, and it is often viewed as a somewhat undesirable fixture that is not is well suited for many public spaces.

According to principles of this invention, this traditional notion may be turned on its head. Instead, for example, a vending machine may offer free information and entertainment, and interact with its users in complex and engaging ways. This would attract people to come to the vending machine, even if they are not initially interested in purchasing something. People would spend more time by the vending machine, and interact more with it. In the course of doing so, people may make purchases from it that they would not otherwise have made.

Also, it is desirable for a vending machine to interact with users in an appropriate and engaging manner. To facilitate such interaction, it is advantageous for a vending machine to be able to detect the level of attention being paid to it, as well as the emotions, social context and gender of its users.

In an exemplary implementation of this invention, sensors in a vending machine may gather audio and video information. A processing unit in the vending machine may calculate an attention score that is indicative of whether attention is being paid to the vending machine. Based at least in part on such calculated attention score, the vending machine may then alter its audio and visual output.

The ability to do so is highly advantageous. For example, in an exemplary embodiment of this invention, a vending machine may detect that a person is paying attention to it. It may then invite that person to play a game, listen to news, or retrieve messages, in each case using the vending machine. If more people approach the vending machine, it may detect this and separately communicate with these new people. Consider a scenario in which three people are already playing a game, using a graphical user interface on the vending machine. If a fourth person walks up, the vending machine may announce to the fourth person that it is a vending machine. It may also announce that the fourth person can purchase a product without waiting for the first three persons to finish their game.

In an exemplary embodiment of this invention, a vending machine may also detect an emotional state, social relationship or gender of a user. Based at least in part on such a detected emotion, social relationship or gender, a vending machine may modify its output.

In some embodiments of this invention, a vending machine may be adapted for use in a public space, such as a train station or airport. For example, a vending machine in a train station may display train schedules or messengers for passengers. By doing so, a vending machine contributes to the purpose of the public space and is better suited for that space. As a result, such a vending machine may be selected for that location, rather than a traditional vending machine.

In an exemplary implementation of this invention, a vending machine may be wirelessly connected to the internet. Users may pay for products dispensed by the vending machine by either cash, coins, credit cards or debit cards. In this exemplary implementation, users may purchase either physical or digital products. For example, a user may purchase a canned beverage from the vending machine, such as a soda. Or a user may use the vending machine to purchase a song and then download the song in digital form.

This invention may be implemented as a vending machine that includes: (a) at least one camera for capturing images and for outputting signals that represent data indicative of said images, and (b) at least one processing unit for (I) analyzing said data to calculate at least one measure of attention that relates to attention given to said vending machine, and (II) outputting instructions regarding humanly perceptible output of one or more transducers, in such a manner that which instructions are outputted depends at least in part on said calculated measure of attention. Furthermore: (1) said processing unit may be adapted for analyzing said data to calculate at least one emotional state of at least one person, and outputting instructions regarding humanly perceptible output of one or more transducers, in such a manner that which instructions are outputted depends at least in part on said calculated emotional state; (2) said processing unit may be adapted for analyzing said data to calculate the gender of at least one person, and outputting instructions regarding humanly perceptible output of one or more transducers, in such a manner that which instructions are outputted depends at least in part on said calculated gender; (3) said processing unit may be adapted for analyzing said data to calculate a social relationship among two or more persons, and outputting instructions regarding humanly perceptible output of one or more transducers, in such a manner that which instructions are outputted depends at least in part on said calculated social relationship, (4) at least one said processing unit may be adapted for analyzing said data to determine whether a human eye is open or shut in at least one said captured image, and for calculating, based at least in part on said determination, at least one said measure of attention, (5) at least one said processing unit may be adapted for analyzing said data to determine direction of gaze of at least one human eye, and for calculating, based at least in part on said determination, at least one said measure of attention, (6) said vending machine may further comprise a sound sensor, and at least one said processing unit may be adapted for calculating at least one said measure of attention, based at least in part on data indicative of sound detected by said sound sensor, (7) said vending machine may further comprise at least one pressure sensor, and at least one said processing unit may be adapted for calculating at least one said measure of attention, based at least in part on data indicative of pressure detected by said pressure sensor. Said vending machine may further comprise at least one input device for accepting data indicative of selections, instructions or information entered by a person, and said processing unit may be further adapted for (I) analyzing said accepted data, and, based at least in part on such accepted data, calculating at least one said measure of attention, and (II) outputting instructions regarding humanly perceptible output of one or more transducers, in such a manner that which instructions are outputted depends at least in part on said calculated measure of attention.

This invention may be implemented as a vending machine that includes: (a) at least one camera for capturing images and for outputting signals that represent data indicative of said images, and (b) at least one processor for analyzing said data indicative of said images to calculate the gender or at least one emotional state of at least one human. Said vending machine may further comprise at least one sensor for detecting sound, and said calculations may be based at least in part on data indicative of said detected sound.

This invention may be implemented as a vending maching including: (a) at least one camera for capturing images, (b) at least one transducer for producing output perceptible to a human, and (c) at least one processor for analyzing data indicative of said captured images to calculate at least one numerical value indicative of attention paid to said vending system, and, based at least in part on said calculated value, producing instructions regarding humanly perceptible output of at least one said transducer. Furthermore: (1) said vending machine may be adapted for connection to an internet, (2) said vending machine may be adapted for wireless communication with other devices, (3) at least one of said transducers may be a graphical user interface, (4) said vending machine may be adapted to permit the download of machine readable code, and (5) said machine readable code may be representative of audio or visual data.

This invention may be implemented as a vending machine including: (a) at least one sensor for detecting light, (b) at least one transducer for outputting stimuli perceptible to a human, and (c) at least one processing unit for (I) analyzing data indicative of said detected light to calculate the gender or at least one emotional state of at least one human, and (II) based at least in part on said calculated gender or emotional state, producing instructions regarding humanly perceptible output of at least one said transducer.

This invention may be implemented as a method comprising the following steps, in combination: (a) capturing images and outputting signals that represent data indicative of said images, (b) processing said data to calculate at least one measure of attention, which measure of attention relates to attention shown to a vending machine, and (c) producing visual or audio stimuli perceptible to a human, in such a manner that which stimuli are produced depends at least in part on said calculated measure of attention. Also, said method may include additional steps of analyzing said data indicative of images to determine direction of gaze of at least one human eye relative to a vending machine, and calculating a measure of attention based at least in part on said determination.

BRIEF DESCRIPTION OF THE DRAWINGS

In the detailed description which follows, reference will be made to the attached drawings.

DETAILED DESCRIPTION

According to principles of this invention, a vending machine may determine if attention is being paid to it, and alter its interaction with its users accordingly.

Figure 1:
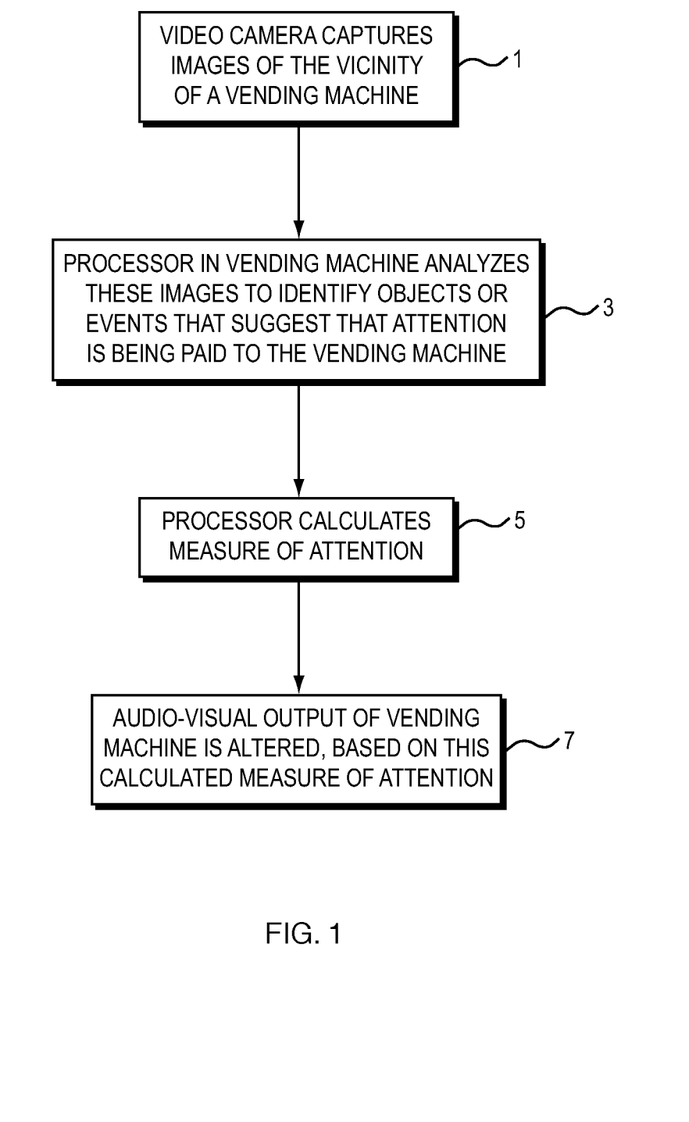
FIG. 1 is a flow chart that illustrates how an attention score is determined and used, in an embodiment of this invention.

FIG. 1 is a flow chart that illustrates how an attention score is determined in an exemplary embodiment of this invention.

A video camera in a vending machine captures images of the vicinity of a vending machine 1. A processing unit in the vending machine analyzes these images to identify objects, events or patterns that suggest that attention is being paid to the vending machine 3. A processing unit in the vending machine calculates a measure of attention 5. The audio-visual output of the vending machine is altered, based at least in part on this calculated measure of attention 7.

In an exemplary implementation of this invention, a vending machine includes a video camera for capturing images of an area in front of the machine. It also includes a microphone for detecting sound. In addition, the vending machine includes a processing unit for processing visual and auditory data gathered by the camera and microphone.

The processing unit may analyze the data gathered by these sensors to recognize objects, events or patterns that indicate that attention is being paid to the vending machine. Each of the following, if recognized in visual images captured by a video camera mounted on a vending machine, may be treated as an indication that attention is being paid to the vending machine: (1) a human face, (2) a face shaking or nodding, (3) eyes open, (4) slow eye blink rate, (5) eye gaze directed at vending machine, and (6) mouth open. If the processing unit spots such an item, the processing unit increases the overall attention score for the scene and the attention score of the person in question.

In some embodiments, this invention may be implemented using the OpenCV (Open Computer Vision) software library for image processing. The OpenCV software is advantageous because it includes code for object recognition using cascaded classifiers and some trained classifiers for finding faces in an image.

Among other things, OpenCV software may be used to find human faces in images of scenes in front of the vending machine. It may also be used to determine the location and size of these faces. The classifier chosen may be limited to finding frontal views of faces, with limited tolerance for rotation (about 30 degrees). This works for purposes of measuring visual attention: If a camera is close enough to the line of sight between a user and a possible target of attention, then a user who is not facing the camera is not, at least visually, attending to that target.

Also, for example, this invention may be implemented in such a manner as to be able to detect whether an eye is open or closed by running a gradient search across the eye region of the face to detect pixels that correspond to the limbus (the iris/scelera boundary). Eye blink rate may be determined by detecting opening and closing of an eye over time. Slow blink rates are associated with deep attention.

In addition, for example, this invention may be implanted in such a manner that the overall position and size of a face may be determined using OpenCV software. This, in turn, allows recognition of head shaking and head nodding.

Also, for example, this invention may be embodied with pressure sensors that detect pressure on the floor near a vending machine, including weight from human feet. Rhythmic stamping or tapping of feet, in time to music being played by a speaker in the vending machine, may be treated as an indication that attention is being paid to the vending machine. Restless shifting of feet, not in time to stimuli provided by the vending machine, may be treated as an indication that a person is distracted and not paying attention.

Also, this invention may be implemented with microphones for detecting sounds in the vicinity of the vending machine. For example, each of the following may indicate that attention is being paid to a vending machine: (a) the sound of a person kicking a vending machine, (b) the sound of dancing feet (e.g., in rhythm to music or visual imagery presented by the vending machine), or (c) louder sounds with frequencies in the human vocal range.

This invention may be implemented in such a manner that direction of eye gaze may be detected. A gaze directed at a vending machine indicates that attention is being paid to that vending machine; whereas a gaze away from a vending machine indicates that attention is not directed at that machine. Conventional techniques of gaze tracking that detect "point of regard" (also known as "point of gaze") may be employed. For example, the eye may be illuminated with an infrared light source, and the first Purkinje corneal reflection (i.e., the reflection from the surface of the cornea) may be measured relative to the location of the pupil center. As the eye rotates, the position of the first Purkinje corneal reflection relative to the pupil center changes. The pupil may be located by contrast. Whether the pupil appears dark or light depends on the angle at which light strikes the eye. If the light path is along with the eye's optical axis, then the eye retina acts as a retro-reflector and the pupil appears bright. If the light path is not aligned with the optical axis of the eye, then the pupil appears dark. Rotating an eye typically has a much larger impact on the relative positions of first Purkinje reflection and the pupil center than does eye translation, so changes in these relative positions tend to be indicators of eye rotation. Alternately, or in addition, other factors may be analyzed for gaze tracking. For example, the apparent size and shape of the pupil changes as an eye rotates. Thus, changes in the apparent pupil size and shape, if not associated with overall movement of the face, may be caused by rotation of the eyes. Likewise, the position of the limbus (the boundary of the iris and sclera) changes as an eye rotates. Thus, changes in the position of the limbus, if not associated with overall movement of the face, may be caused by rotation of the eyes. Overall movement and orientation of a face may be determined (e.g., by OpenCV, as discussed above), allowing eye rotation to be disambiguated from eye translation in those two cases (pupil size and shape, and position of limbus).

Likewise, mouth positions (e.g., smiling, frowning, speaking) may be detected, by tracking multiple points on a face and their position relative to each other.

This invention may be implemented using only overall attention scores. Such a score may be based, for example, solely on the number of faces in a scene.

Alternately, this invention may be implemented using both overall and individual attention scores. In this approach, the processing unit keeps track of each face from frame to frame, using the assumption that faces will not move large distances or make large size changes between frames. This in turn allows each face to have its own individual attention score. The overall attention score may be the sum of the individual ones. Alternately, the overall score may be the sum of the individual scores plus additional amounts for, e.g., overall noise volume.

Figure 2:
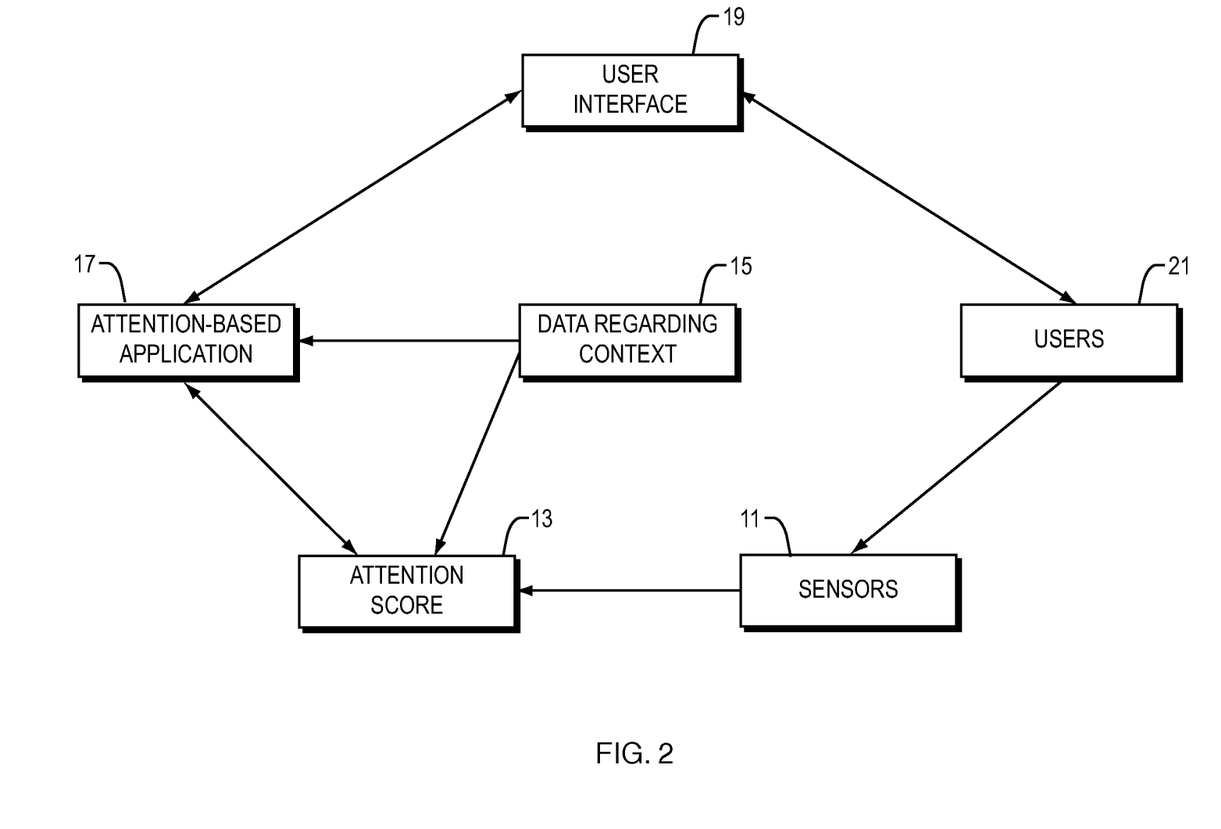
FIG. 2 is a flow chart that that illustrates the impact of data regarding context, in an implementation of this invention

FIG. 2 is a flowchart that illustrates the impact of data regarding context, in an exemplary implementation of this invention. Sensors 11 gather data regarding phenomena in the vicinity of a vending machine. These sensors may be a video camera and a microphone. In addition, the sensors may include pressure sensors on the floor. Based on data gathered by these sensors, one or more processing units calculate at least one attention score 13. For example, both an overall score and individual scores may be calculated. The weight given to various indicia of attention (e.g., mouth in smiling position) depends in part on context. For example, smiling right after a vending machine tells a joke may be a stronger indication of attention than smiling when the vending machine is merely displaying the news. Accordingly, when the processing unit calculates attention scores, it may take into account data regarding the context 15. The processing unit runs at least one attention-based application 17, using the calculated attention score. This software application may, for example, output instructions for complex interactions with human users, based at least in part on these attention scores 13 and on data regarding context 15. These instructions may include signals indicative of stimuli to be produced by a user interface 19. For example, the user interface may be comprised of graphical user interfaces and speakers for generating sound. Users 21 (e.g., people standing near the vending machine) may interact with the vending machine through the user interface 19.

Figure 3:
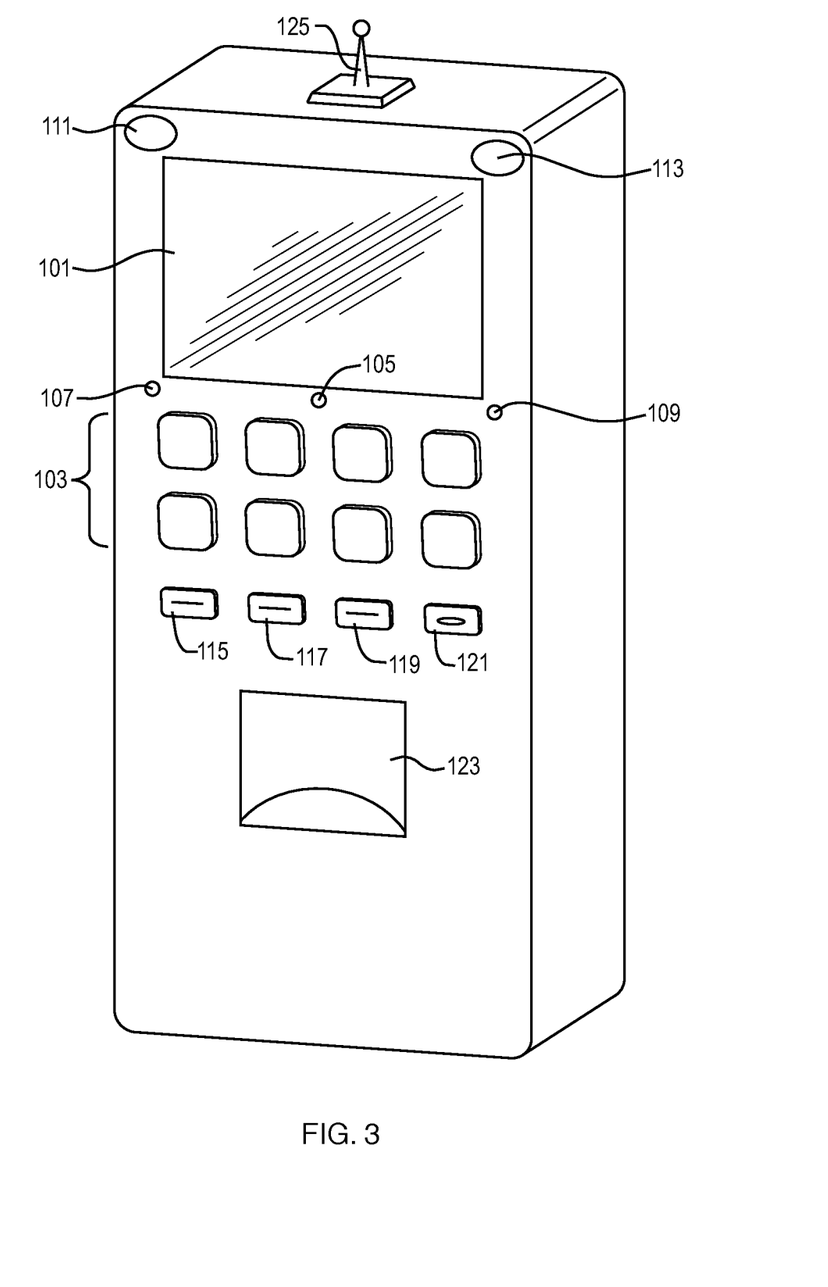
FIG. 3 is a perspective view of a vending machine, in an embodiment of this invention.

FIG. 3 shows an illustrative embodiment of this invention. On the front of the vending machine are nine display screens, one of which is large 101, and eight of which are smaller 103. The display screens may be implemented with conventional digital display technology, such as plasma screens, TFT-LCD (thin film transistor liquid crystal display) screens, LCOS (liquid crystal on silicon) screens or OLED (organic light emitting diodes). The eight smaller displays 103 are mounted on eight buttons that a user may press in order to interact with the vending machine. For example, by pressing on these buttons, a user may make product selections or enter information or instructions. On the front of the vending machine are also a lens of a video camera 105 and two microphones 107, 109. In addition, on the front of the vending machine, there are a receptacle for coins 115, a receptacle for paper currency 117, a receptacle for credit cards or debit cards 119, and a port 121 for downloading digital content. In addition, the front of the vending machine includes a bin 123 into which canned beverages are dispensed. Two speakers 111, 113 are located on the front of the vending machine. On top of the vending machine is an external antenna 125. Two 2.3 GHz Intel® Windows® computers are mounted on the back of the vending machine. The displays are driven by 4 display cards housed in the computers. Wires for transmission of data connect these two computers with each other and, among other things, the displays, the interactive buttons, and the video camera. The vending machine has one or more wires for connecting it to an external electrical power source, such as a wall outlet.

This invention may be implemented in such a manner that a processing unit in a vending machine analyzes data gathered by sensors (such as a microphone and video camera) to detect emotions of the users.

For example, conventional methods for detecting emotion using acoustical analysis of the pitch and energy of a human voice may be employed. These methods may rely on HHM (hidden Markov models) and GMM (Gaussian mixture models), and may use feature warping to adjust for variation among users.

Also, for example, standard methods for detecting emotion from visual images of faces may be employed. Such methods may include detecting faces, extracting facial features, classifying facial expressions, and correlating these expressions with certain emotions. For example, an image of a face may be segmented into skin and non-skin areas, based on the red (Cr) and blue (Cb) chroma values of the image. Also, for example, chroma components may be used to identify a mouth, which has stronger red (Cr) and weaker blue (Cb) values than other parts of the face. The shape of a mouth may indicate whether a person is smiling or frowning and thus whether a person is happy or sad.

In illustrative embodiments of this invention, a vending machine may alter its output as a result of such detected emotions. For example, if a person sounds excited when an image of a particular product is displayed, a vending machine may display more images of that product and related products.

Figure 4:
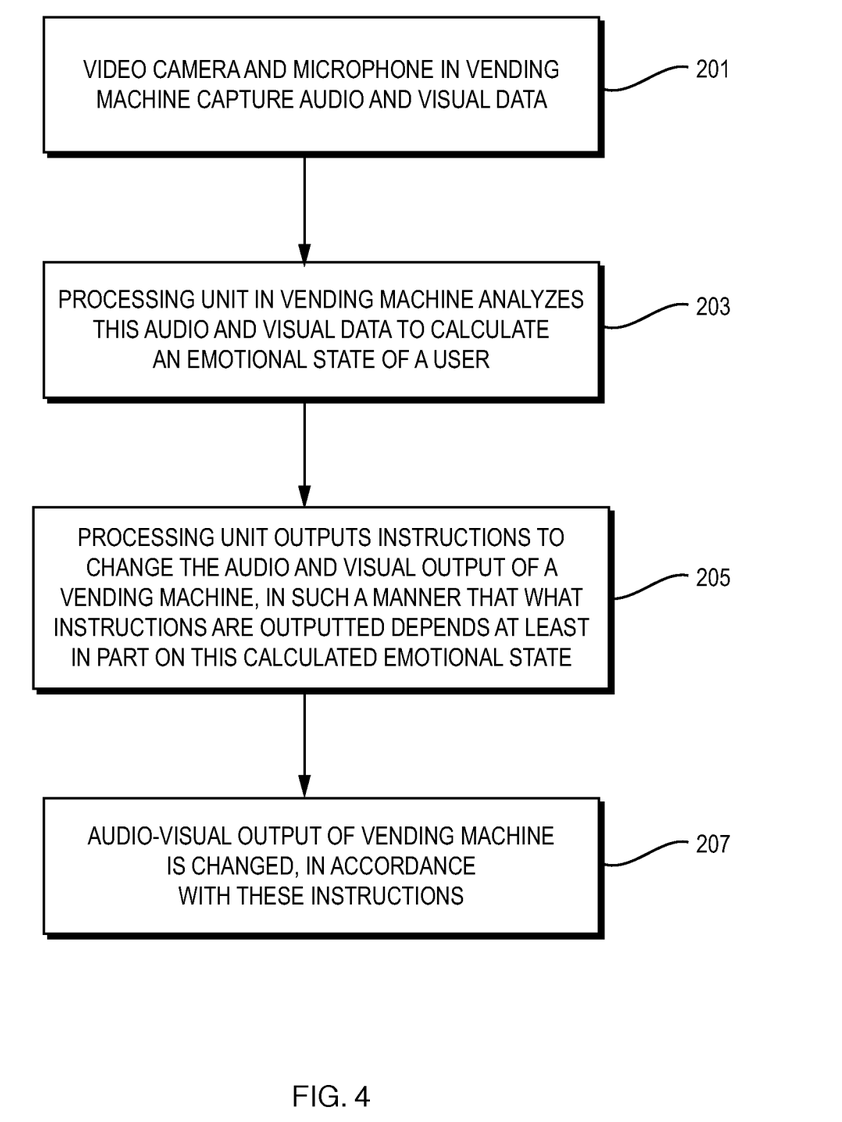
FIG. 4 is a flow chart that illustrates a vending machine detecting an emotional state of a user and altering its audio-visual output in response, in an embodiment of this invention.

FIG. 4 is a flow chart that illustrates a vending machine detecting an emotional state of a user and altering its audiovisual output in response, in an exemplary embodiment of this invention. A video camera and microphone in a vending machine capture audio and visual data 201. A processing unit in the vending machine analyzes this visual and audio data to calculate an emotional state of a user 203. A processing unit in the vending machine outputs instructions for altering the audio and visual output of the vending machine, in such a manner that what instructions are outputted depends at least in part on this calculated emotional state 205. The audiovisual output of the vending machine is adjusted in accordance with these instructions 207.

This invention may be implemented in such a manner that a vending machine may detect a social relationship. For example, a processing unit in a vending machine may, at least in some cases, analyze video and voice data to identify a pair of users as likely to have an adult-child relationship. For example, if video data shows that two persons approach a vending machine together, and that one is 6 foot tall and the other 4 foot tall, and microphones record only two human voices, one with a pitch of about 50 Hz and the other with a pitch of about 600 Hz, this may indicate that the two have an adult-child relationship.

In an illustrative embodiment of this invention, a vending machine may alter its output based on a detected social relationship. For example, if a vending machine identifies a pair of users as having an adult-child relationship, the vending machine may, at a child's eye level, display products likely to appeal to a child, and, at an adult's eye level, display content more suited for an adult. This may cause both of them to tend to linger at the machine longer, until the child asks for a product and the adult buys it.

This invention may be implemented in such a manner that a vending machine may detect gender of a user. For example, a processing unit in a vending machine may analyze video and voice data to determine a user's likely gender based on factors such as voice pitch, height, and facial features (such as a beard or the shape of a chin). In an illustrative embodiment of this invention, a vending machine may alter its output based on such detected gender. For example, if a vending machine in a shopping mall detects that a user is likely a woman, it may alter its map of the mall to highlight stores that cater to women.

Figure 5:
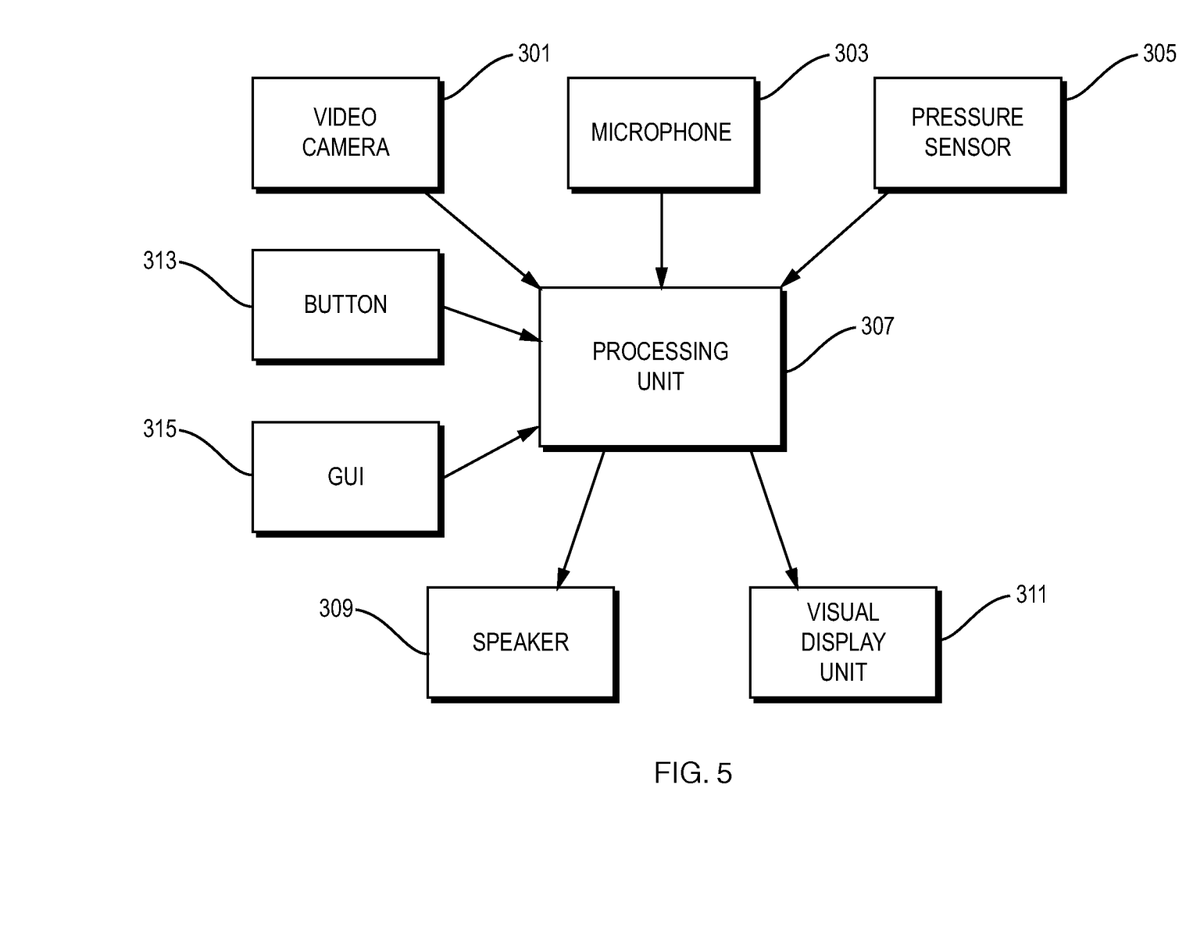
FIG. 5 is a diagram of a vending machine, in an embodiment of this invention.

FIG. 5 is a diagram that illustrates an implementation of this invention. A vending machine includes sensors comprised of a video camera 301, a microphone 303, and a pressure sensor 305. A video camera 301 captures images and outputs signals indicative of these images. A microphone 303 detects sounds and outputs signals indicative of said sounds. A pressure sensor 305 measures pressure and outputs signals indicative of these measurements. A processing unit 307 analyzes this visual, audio or pressure data to identify objects, events or patterns that indicate a user's gender, and calculates the user's gender. Or a processing unit 307 analyzes this visual, audio or pressure data to identify objects, events or patterns that indicate that attention is being paid to the vending machine, and calculates an attention score. Alternately, a processing unit 307 analyzes this visual, audio or pressure data to identify objects, events or patterns that are indicative of an emotional state, and calculates at least one emotion of a user. Or a processing unit 307 analyzes this visual, audio or pressure data to identify objects, events or patterns that indicate a social relationship among two or more persons, and calculates such a social relationship. Based at least in part on these calculations (of gender, attention, emotion or social relationship), a processing unit 307 outputs instructions regarding the audiovisual output of the vending machine. For example, these instructions may direct that the audiovisual output be modified. Based on these instructions, transducers, such as a speaker 309 and video display units 311, produce audio and visual signals perceptible by humans.

In an exemplary implementation of this invention, a user may enter data indicative of product selections or other information or instructions. By doing so, a user may affect calculations of attention, emotion, gender or social relationship. For example, a person may enter such data by pressing a button 313 or using a GUI (graphical user interface) 315. A processing unit 307 in a vending machine may accept such data and, based at least in part on such data, calculate attention, emotion, gender or social relationship.

The following is a description of hardware used for a vending machine, in an exemplary embodiment of this invention. In addition to one or more computers (e.g., the two 2.3 GHz Intel® Windows® computers used in an instantiation of this invention), such hardware may comprise the following:

The vending machine's hardware may include a network node that comprises three devices: a VLAN (virtual LAN)-configurable switch, a wireless port, and a Linux host. The switch and Linux host exchange VLAN tagged packets. The network node enables access to the internet, and is also connected to machine hardware.

The vending machine's hardware may include a local data storage device, for storing content that may be too large to download or stream effectively. This local storage device may be accessible through a download port offering. Content can be delivered to the vending machine through interface over USB (universal serial bus). The content stored on this local data storage device may be displayed as video on the displays or played as music or other sound on the speaker.

The vending machine may include conventional computer hardware and firmware for controlling the internal state of a vending machine, such as temperature control, and for exchanging data and instructions with the operating system of the network node.

In an exemplary implementation of this invention, the general operating software of a vending machine comprises a number of local machine hooks that communicate with a base operating system. These hooks are exposed through a stat daemon (for maintenance and machine information) and a portal daemon (that provides network access and application support). These daemons are discussed in more detail below. The term "daemon" refers to a computer program that runs in the background.

Hierarchically, the software has a node Wi-Fi structure and local operating system, with an exposed monitor and social infrastructure built on top of this. At the network level two sandboxes provide applications with different authentication requirements—community generated 'insecure' applications and partner commerce 'secure' applications.

In an exemplary implementation of this invention, software runs locally on each vending machine. This local software comprises machine hooks, an operating system, local store device software, a portal daemon and a stat daemon.

The local software includes machine hooks, which are low level code for communicating with various aspects of machine hardware (or intermediaries, in the case of a proprietary machine chipset). These may include (1) a Machine Inventory Hook, which registers the current inventory of the machine, (2) a Machine Finance Hook, which registers the current cash content of the machine and provides functionality, (3) a Machine Temp Hook, which registers the operating temperature of the machine, (4) a Machine Power Hook, which registers information on machine power use and status, and (5) a Machine Button Activity Hook which provides information on button presses and mappings to remote content actions, including JavaScript® and Python™ bindings.

The local operating system may be an embedded solution that offers complete or supplemental (with machine chipset) control of the machine hardware. It also provides structure for higher level machine access through the running daemons. For example, OpenWRT, a Linux distribution suitable to embedded devices, may be used as the local operating system.

The software for the local store device may provide local network access to additional content, such as movies or music that could suffer a performance loss due to limited network bandwidth. This software functions by resolving network calls for rich media that is housed locally to the local infrastructure, and by providing a network level access for these files.

The portal daemon may be a captive portal program, such as the open source WiFiDog captive portal solution. The portal daemon provides an active portal infrastructure running off the local server/router interface. It routes incoming access to an authorization server. It also provides access to network level functions, even if they are funneled to a local repository structure.

The stat daemon may be a limited private access program that exposes machine information API (application program interface) from the local machine hooks. This can be used in a limited fashion by the social networking infrastructure, and more extensively in the administrative machine listing.

In an exemplary implementation of this invention, a vending machine is part of a network, and network software may run either on a single vending machine or distributed across vending machines. This network software includes a captive portal solution, which provides general access to the social infrastructure capabilities of the network and user registration, profiling, and access to the secure and insecure sandbox.

In an implementation of this invention, the capabilities of external administration applications vary depending on the kind of connection offered: e.g. administrative, associate or unsecured connections. The capabilities of administrative applications can be controlled with respect to a variety of different connection types: In this implementation of the invention: Administrative level connections provide full access to machine details at all levels, limited by MAC (media access control) address. In addition to write access to insecure and secure sandboxes, admin level connections provide full access to the machine status viewport. Associate level connections are limited by MAC address, specified for the manipulation of content by business partners operating commerce or content delivery through the secure sandbox. Unsecured connections provide access to the general social infrastructure, which includes some details related to machine listing and read access to the insecure sandbox and secure sandbox. Certain unsecured connections can be provided with user account level access to additional information on machine listing and with write access to the insecure sandbox. This can include application performance for applications running on the insecure sandbox at a machine level, for example.

In an implementation of this invention, each vending machine can be viewed administratively over a secured or unsecured web connection to the network site. Secured connections, which are limited by registered MAC address, enable detailed administrative access to the machines. Unsecured connections provide general information on status, and the capability to access the insecure sandbox for user level content.

In an exemplary implementation of this invention, a vending machine may be wirelessly connected to the internet. The wireless connection may be persistent, and may for example be implemented using Bluetooth® (such as Bluetooth® version 3.0, 2.1, 2.0, 1.2 or 1.1, the latter two versions of which were approved as IEEE standards 802.15.1-2005 and 802.15.1-2002, respectively) or using WLAN (wireless LAN) in accordance with IEEE Standard 802.11. Alternately, the internet connection may be wired. In some instantiations of the invention, a vending machine acts as an access point for persons seeking to access the internet. In that case, the vending machine acts effectively as an internet kiosk, allowing access to the internet, either for free or for a cost.

A wireless connection may be used to advantage for digital content delivery. According to principles of this invention, a vending machine may allow a user to browse and subsequently purchase digital content, such as movies, games, books or songs. This purchase is facilitated by either remote delivery of purchased content or physical download, using a download port. As illustrated in FIG. 3, a download port 121 may, for example, be located on the front of a vending machine.

A wireless connection may also be used to advantage for remote monitoring of a vending machine's inventory and activities. For example, a wireless connection may enable a vending machine to provide data to a remotely located person regarding the machine's inventory (e.g., the number of cans of soda currently stocked in the machine) and operations (e.g., purchases and other interactions with users).

A wireless connection may also be used to advantage for remote payment. For example, a wireless connection may enable a vending machine to accept data indicative of the fact that a person has remotely paid for the purchase of an item from the vending machine, e.g., by using an online credit card transaction or by debiting an online account.

As noted earlier, this invention may be implemented in such a manner that a vending machine: (a) uses a video camera and microphones to detect phenomena that indicate that attention is being paid to the vending machine, (b) has large scale output displays as well as smaller interactive display buttons on the front of the machine, and (c) has speakers for audio output. This features may be used to advantage so that a vending machine serves both as a rich output device for digital content and as a compelling interaction system.

In an exemplary implementation of this invention, a vending machine supports a number of interaction styles, which can be referred to as tangible, local and remote. In a tangible interaction, a user directly interfaces with the machine through touch. In a local interaction, one or more devices that are not part of the vending machine are used as an intermediary. For example, local interactions with vending machines may include web page access over a laptop's WiFi, or text messages sent from a mobile device. Remote interactions with a vending machine may also occur. For example, a user could purchase a soda in advance or for a friend and leave it at a vending machine. Alternatively a user could post a message to a vending machine.

This invention may be implemented in such a way as to allow many interactive applications, including passive information display, active information display, local interactive content and remote interactive content.

With a passive information display, a vending machine may offer passive, meaningful information through output. This information may be as simple as a map of the surrounding regions, or include flight information for machines located at an airport, or rich media content such as the local news. This information may be keyed to the relevant spatial or temporal context surrounding the machine.

In the case of an active information display, a vending machine may offer digital content that may be browsed and purchased. For example, an interactive display button may show a movie preview clip that plays when the user presses it. The user may purchase the movie and download it, either from the internet or using a download port on the vending machine.

A vending machine may provide local interactive content, such as games, that require active input from users. This may take the form of button pressing games, such as Simon Says.

A vending machine may support remote interactive web games with a local display. For example the machine may offer a word spelling game over WiFi. The game can be played over these devices while physically present or remotely over the internet. A vending machine that is part of a network of similar machines may also support complex games, such as treasure hunt style interactions, that require visiting or interacting with specific spatially located machines at both local and remote levels.

This invention may be used to advantage to attract people to come to a vending machine and to spend time interacting with the vending machine, not just for the reason of getting a product, but for other reasons as well. By attracting people to spend more time interacting with the vending machine, the effect may be to increase sales from the vending machine.

Consider an exemplary embodiment of this invention, in which a vending machine has 14 displays on its front surface. 12 of them are 800 by 600 video displays, and two 1024×1290 displays are above those displays with a camera between them. In this example, the twelve smaller displays are mounted on buttons, which a user may push to interact with the vending machine, in addition to normal vending controls. In this example, visual data captured by the camera is analyzed to recognize items that indicate that attention is being paid to the vending machine.

Here are some examples of how such an attentionally aware vending machine with multiple displays may facilitate interactions with its users.

News and weather may be displayed on large displays at the top front of the vending machine. To foster interaction, the news can always be a short headline allowing an interested person to select the story from buttons below. A video camera in the vending machine captures visual images, which are analyzed by a processing unit to determine when a person approaches the vending machine and how many people there are in the captured images. The vending machine alters its audio-visual output based on such analysis. For example, if there are already people in front of the machine looking at a map or news, and a new person approaches, the vending machine may introduce itself to a new person by saying "I can vend soda" or "I can interact".

According to principles of this invention, a vending machine may facilitate the playing of games. These games may attract people, keep them standing around, and let them enjoy themselves. These games may be interrupted by anybody coming up or putting money into the vending machines.

In this example, the buttons themselves are displays. Some of the buttons may be pressed to select a product. Each such button presents a few second display of a person celebrating whatever product pressing the button will provide. This display may comprise active images. For example, if a vending machine dispenses cans of soda, the buttons may show people pouring soda cans into their mouths on a hot summer's day, completing some sports action and showing the soda, and opening sodas. When a person presses one of these buttons to select a product, the vending machine dispenses the product and all of the video displays on the front of the video machine may display a celebration of the purchase. For example, the displays may show a cheerful video of dancing black-eyed peas.

In this example, a vending machine may make other kinds of interactions available, such as using the buttons to select various headline stories and various games that will attract people. For example, multiple buttons on the front of the vending machine may allow a few people to play Simon Says, creating some competition. Or people may press buttons on the vending machine, which buttons display drums, causing speakers on the vending machine to play a drumming sound. By doing so, people may drum by themselves, with another, or to some music.

In this example, a vending machine may allow users to put together puzzles. Different buttons may display different pieces of the puzzle. A person can select a button and by repeatedly pressing it cycle through pieces of a picture. When the pieces are in the right place, people see the picture and all the displays in the front of the vending machine may show a video that the picture comes from. For example, the video may be a dramatic ski jump or a piece of a music video. Six buttons on each side of the vending machine can each show the same or a different puzzle to allow to people to compete for how fast they can complete the puzzle.

In this example, a vending machine may allow a user to participate in a word game. The user is given letters to use for spelling. As a user makes the words, they go up on a semi-permanent display. Another person can add to the display. When a person comes back another time they would see their work and how others have added to it.

In an implementation of this invention, microphones in a vending machine may also be used to detect when a product, such as a can of beverage, is dispensed.

The number and size of the video displays may vary. For example, this invention may be implemented with only one large video display.

In some embodiments of this invention, buttons used to select products are only traditional buttons, and are not interactive video display buttons as described above. In that case, any visual displays in the vending machine are separate from the product-selection buttons. In such an embodiment, a vending machine may still allow remote interaction, for example, by using WiFi, text message or Bluetooth® technologies.

In some implementations of this invention, a wireless connection may be used to advantage to customize interaction with a particular user. For example, this invention may be implemented as a vending machine adapted to receive and transmit information from and to a wireless device carried by a user. For example, a vending machine may be adapted to wirelessly receive information that indicates that the user is entitled to certain promotional rates, or has pre-paid for services or products. Or such received information may indicate that a user is a diabetic or has other dietary restrictions, and the vending machine may change its behavior accordingly, by changing the selection of items offered to such user. Or such received information may be used by a vending machine to produce a product, such as printing the user's picture on a beverage cup into which the vending machine dispenses a beverage. Also, for example, a vending machine may be adapted to wirelessly send a calorie count or an electronic "ticket" indicative of the fact that a person is entitled to a product or service (such as a train ride, movie or parking).

Finally, a definition: "Product" means a product or service.

CONCLUSION

It is to be understood that the methods and apparatus which have been described above are merely illustrative applications of the principles of the invention. Numerous modifications may be made by those skilled in the art without departing from the scope of the invention. The scope of this invention is limited only by the claims that follow.

What is claimed is:

1. A vending machine including:
   (a) at least one camera for capturing visual data;
   (b) at least one microphone for capturing sound data indicative of whether or not the vending machine is being kicked;
   (c) at least one transducer for producing output perceptible to a human; and
   (d) at least one processor for
       (i) analyzing the visual data and the sound data to calculate at least one numerical value indicative of attention being paid to the vending machine, and
       (ii) based at least in part on the at least one numerical value, producing instructions to control humanly perceptible output of the at least one transducer.

2. The vending machine of claim 1, wherein:
   (a) the vending machine includes a user interface; and
   (b) the at least one processor is also configured for
       (i) analyzing the visual data to recognize a scenario in which, while one or more persons are already playing a game using the user interface, an additional person approaches the vending machine, and
       (ii) if such a scenario is recognized, outputting instructions to control the at least one transducer to produce signals that indicate that the additional person may purchase a product without waiting for the game to finish.

3. The vending machine of claim 1, wherein the at least one processor is configured to analyze the visual data, the sound data, and context data regarding prior output of the at least one transducer, to calculate the at least one numerical value.

4. The vending machine of claim 1, wherein the vending machine is adapted to permit the download of machine readable code, which machine readable code is representative of audio or visual data.

5. A method comprising the following steps, in combination:
   (a) capturing visual data of a scene external to a vending machine;
   (b) capturing audio data indicative of whether or not a person is kicking the vending machine;
   (c) processing the visual data and audio data to calculate at least one measure of attention that is indicative of the level of attention shown to the vending machine; and
   (d) producing visual or audio stimuli perceptible to a human, in such a manner that which stimuli are produced depends at least in part on the measure of attention.

6. The method of claim 5, which method also includes the steps of analyzing the visual data to determine direction of gaze of at least one human eye relative to the vending machine, and calculating a measure of attention based at least in part on the direction of gaze.

7. The method of claim 5, wherein the vending machine further comprises a user interface and the method further comprises the steps of:
   (a) analyzing the visual data to recognize a scenario in which, while one or more persons are already playing a game using the user interface, an additional person approaches the vending machine; and
   (b) if such a scenario is recognized, outputting instructions to control one or more transducers to produce signals that indicate that the additional person may purchase a product without waiting for the game to finish.

8. The method of claim 5, wherein, not only the visual data and the audio data, but also context data regarding prior humanly perceptible stimuli produced by the vending machine, are processed to calculate the at least one measure of attention.

9. The vending machine of claim 8, wherein the context data is regarding prior output that comprises a joke.

10. A vending machine—that includes:
    (a) at least one camera for capturing images and for outputting signals that represent visual data indicative of the images;
    (b) one or more transducers for producing humanly perceptible signals, which one or more transducers comprise a user interface;
    (c) at least one processing unit for
        (i) analyzing both context data regarding prior output of the one or more transducers and the visual data to calculate an attention score that is indicative of whether attention is being given to the vending machine,
        (ii) outputting instructions to control the one or more transducers, in such a manner that which instructions are outputted depends at least in part on the attention score,
        (iii) analyzing the visual data to recognize a scenario in which, while one or more persons are already playing a game using the user interface, an additional person approaches the vending machine, and
        (iv) if such a scenario is recognized, outputting instructions to control the one or more transducers to produce signals that indicate that the additional person may purchase a product without waiting for the game to finish.

11. A vending machine that comprises:
    (a) at least one camera for capturing images and for outputting signals that represent visual data indicative of the images;
    (b) one or more transducers for producing humanly perceptible signals;
    (c) a microphone for detecting sound data indicative of whether or not the vending machine is being kicked; and
    (d) at least one processing unit for
        (i) analyzing the visual data, the sound data, and context data regarding prior output of the one or more transducers, to calculate an attention score that is indicative of whether attention is being given to the vending machine, and
        (ii) outputting instructions to control the one or more transducers, in such a manner that which instructions are outputted depends at least in part on the attention score.

* * * * *